(12) United States Patent
Rynk et al.

(10) Patent No.: US 9,307,060 B2
(45) Date of Patent: Apr. 5, 2016

(54) ILLUMINATED INTEGRATED SPEAKER PORT INSERT AND BUTTON

(71) Applicant: Google Technology Holdings LLC, Mountain View, CA (US)

(72) Inventors: Evan F Rynk, Boca Raton, FL (US); Julio C Castaneda, Coconut Creek, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 88 days.

(21) Appl. No.: 14/258,605

(22) Filed: Apr. 22, 2014

(65) Prior Publication Data

US 2015/0304463 A1    Oct. 22, 2015

(51) Int. Cl.
*H04M 1/02*         (2006.01)
(52) U.S. Cl.
CPC ..................... *H04M 1/026* (2013.01)
(58) Field of Classification Search
CPC . H04W 8/245; H04W 12/08; H04M 1/72583; G06F 8/66
See application file for complete search history.

(56) References Cited

U.S. PATENT DOCUMENTS 8,620,162 B2 * 12/2013 Mittleman ................ 398/106
2005/0219228 A1 * 10/2005 Alameh et al. ............ 345/173
2009/0305742 A1 * 12/2009 Caballero et al. ......... 455/566

OTHER PUBLICATIONS

Matthew H. Naitove, "Micro Molder & Mold Maker Succeeds by Specializing", Plastics Technology, http://www.ptonline.com/articles/micro-molder-mold-maker-succeeds-by-specializing, May 2011, 5 pages.
Muhammad Zohair Chohan, "JBL PlayUp Wireless Speaker for Nokia: Review", ProPakistani, http://propakistani.pk/2013/03/20/jbl-playup-wireless-speaker-for-nokia-review/, Mar. 20, 2013, 8 pages.

* cited by examiner

*Primary Examiner* — Brandon Miller
(74) *Attorney, Agent, or Firm* — Faegre Baker Daniels LLP

(57) ABSTRACT

Electronic devices such as smartphones (100) or tablet computers are provided with an illuminated integrated speaker port insert and button (110) which allows audio energy to pass out of the speaker port (108), serves as control button for a function such as volume control or power, and is provided with single or multi-color illumination (212) so as to serve as a visual information indicator. The button (110) can serve in place of side mounted button while not requiring additional allocation of area on the devices front surface beyond what would be allocated for a speaker port and therefore not reduce the area available for a display screen (203). The button may be more readily located by touch due to its location and by sight due to the provision of illumination and owing to its use as a speaker port insert the purpose of the button may be intuitively grasped and later recalled by the user.

11 Claims, 10 Drawing Sheets

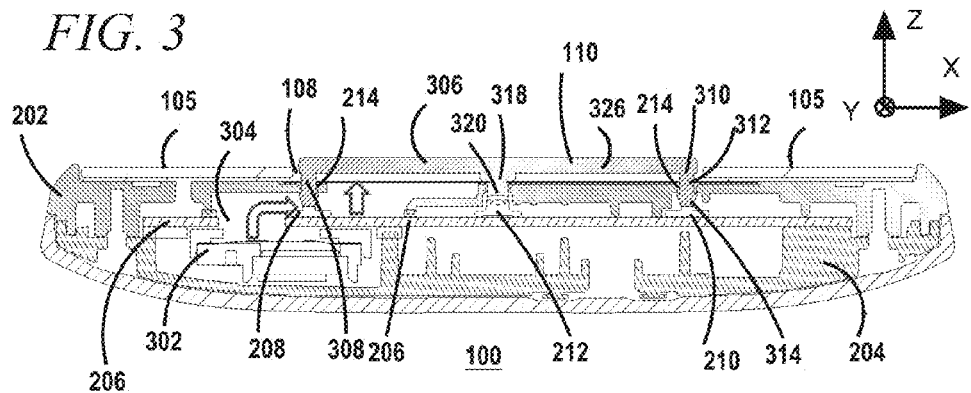
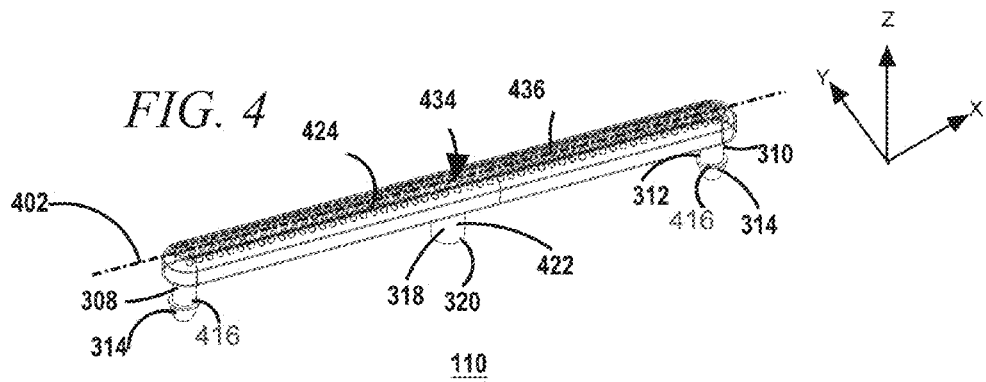
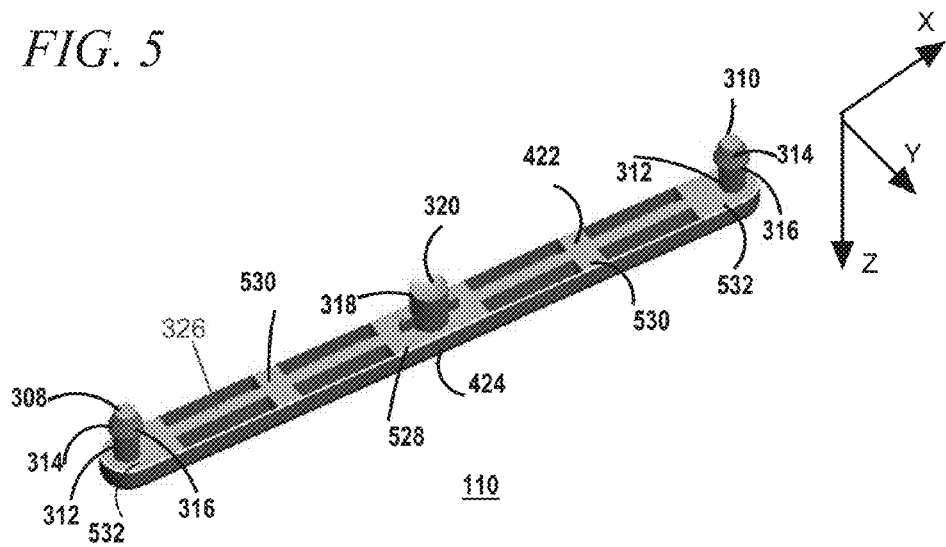

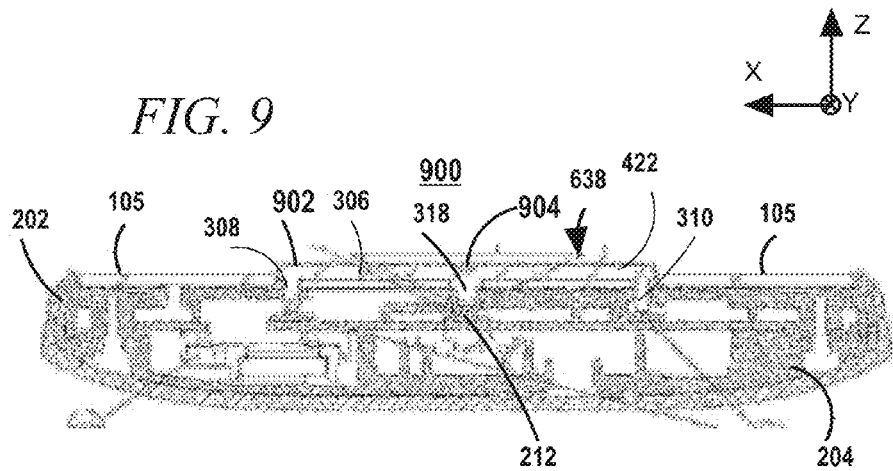
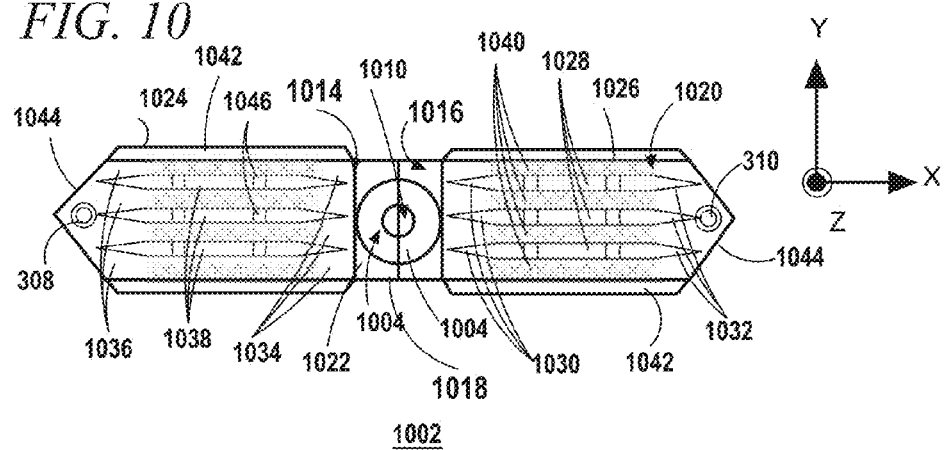
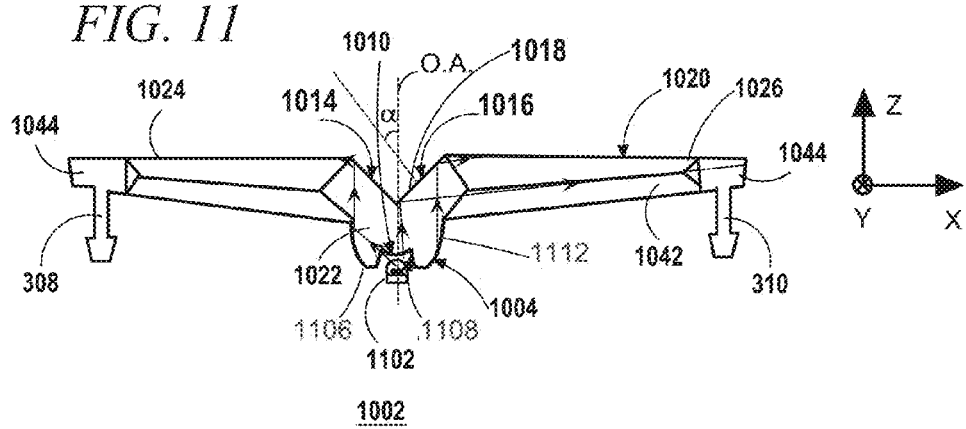

Prior Art

US 9,307,060 B2

ILLUMINATED INTEGRATED SPEAKER PORT INSERT AND BUTTON

FIELD

The present specification relates generally to electronic devices such as smart mobile telephones, portable media players, and tablet computers. More particularly the present specification relates to button controls for mobile telephones, portable media players, and tablet computers.

BACKGROUND

Currently high end mobile electronic telephones take the form of smartphones, which have only a small number (e.g., one or two) physical buttons but have a large touch screen display, through which a user using several touch gestures is able to operate basic telephone functionality such as sending and receiving telephone calls as well as operate a variety of manufacturer provided and third party software applications ('apps'). While most of the tactile user interaction with such smartphones is via virtual controls (e.g., buttons, keyboards, keypads) that are emulated on the touch screen display, such smartphones do retain a few actual physical buttons. One such button is the power button and another that is typically provided is a volume control rocker button. In keeping with the current design trend and in order to avoid placement of components on the front of the device that would limit the fraction of the front of the device available for the display, certain physical buttons such as the volume control rocker button and power button have been located on side edges of the device. Such side edge buttons are slim, and protrude out of the housing of the device by only a small amount and they can be difficult to locate by feel, as might be convenient in dimly lit location. In fact due to their location and diminutive size they may sometimes not be readily located by sight in a well lit room.

FIG. 19 shows a prior art smartphone 1900. The prior art smartphone 1900 includes a rear housing part 1902 connected to a front housing part 1904. A front surface 1906 of the smartphone 1900 accommodates a touch screen display 1908 which occupies a large fraction of the front surface 1906. An earpiece speaker port 1910 is located on the front surface 1906 of the smartphone 1900 above the touch screen display 1908. A loudspeaker port 1912 is located on the front surface 1906 of the smartphone 1900 below the touch screen display 1908. A slim, low profile power button 1914 and a slim, low profile, volume control rocker button 1916 are located on a side edge 1918 of the smartphone 1900.

Certain recently produced tablet computers have outward mechanical designs that are basically scaled-up versions of smartphones including a touch screen which occupies a large fraction of the front of the device and a limited number of small edge-mounted physical buttons.

It would be desirable to provide a physical button for a mobile telephone or tablet computer that requires no or limited extra allocation of space on the front of the device so as not to limit the space available for the display, and that is more readily located by sight or touch and in some cases is so situated that its purpose is intuitively apprehended based on its location.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 3 is a cross sectional view of the electronic device shown in FIG. 1 and FIG. 2;

FIG. 4 is a perspective view of an illuminated integrated speaker port insert and rocker button that is used in the electronic device shown in FIGS. 1-3 according to an embodiment;

FIG. 5 is a second perspective view of the illuminated integrated speaker port insert and rocker button that is shown in FIG. 4;

FIG. 9 is a cross sectional view of an electronic device according to yet another embodiment;

FIG. 10 is a top view of an illuminated integrated rocker button and speaker port insert according to yet another embodiment;

FIG. 11 is an elevation view of the illuminated integrated rocker button and speaker port insert shown in FIG. 10 along with an LED that is used to illuminate it;

Figure 1:
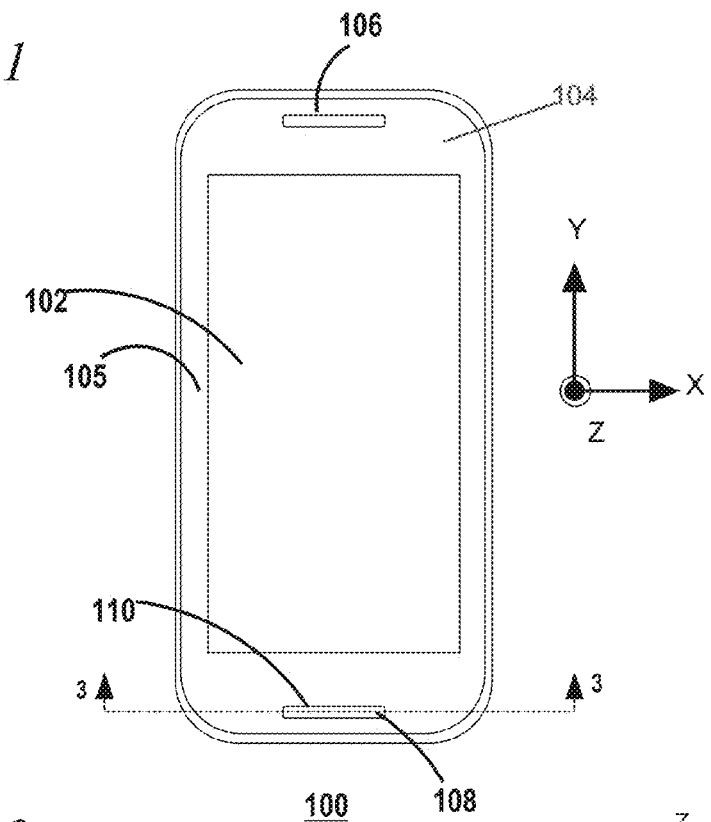
FIG. 1 is a front view of an electronic device according to an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments set forth in the present disclosure.

DETAILED DESCRIPTION

Before describing in detail embodiments, it should be observed that the embodiments reside primarily in combinations of method steps and apparatus components related to an illuminated integrated speaker port insert and button. Accordingly, the apparatus components and method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Figure 2:
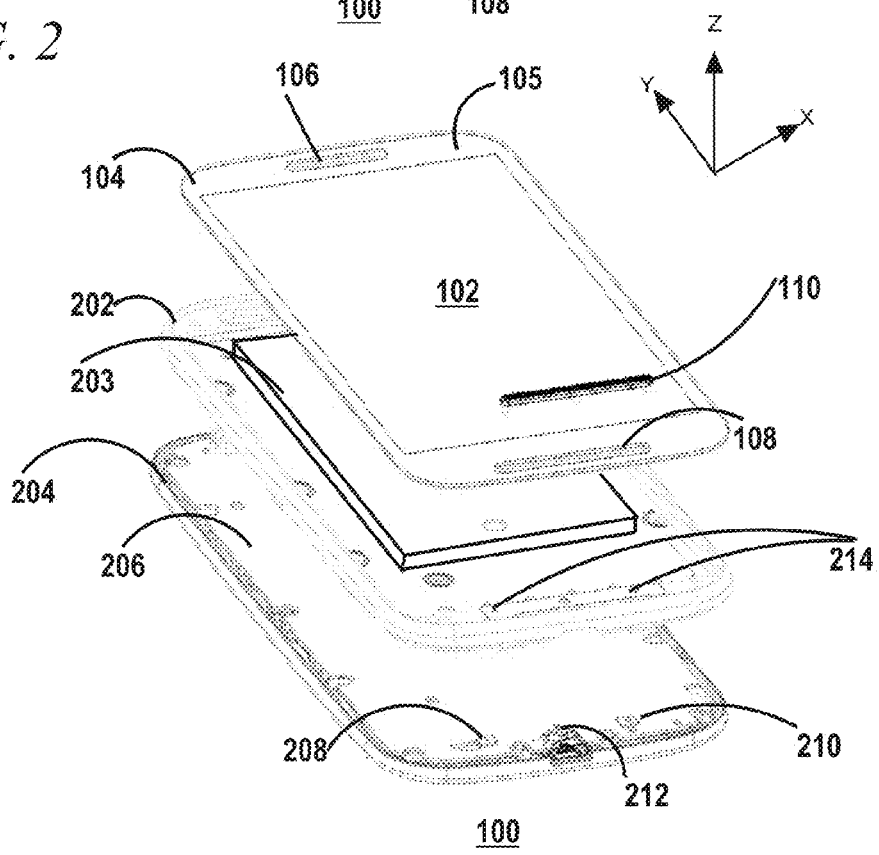
FIG. 2 is an exploded view of the electronic device shown in FIG. 1.

FIGS. 1-3 are different views of an electronic device 100. In the following examples, the electronic device is a smartphone; however, other electronic devices could be substituted such as any type of computer, a remote controller, a media player, an electronic game or game controller, a television receiver, or other portable or non-portable electronic device. FIG. 1 is a front view of the smartphone 100, FIG. 2 is an exploded view of the smartphone 100, and FIG. 3 is a cross sectional view of the smartphone 100 according to an embodiment. The cut plane of the cross sectional view of FIG. 3 is indicated in FIG. 1. The smartphone 100 includes a touch panel 102 formed on an oversized lens 105 which forms at least part of the front of the smartphone 100. The lens 105 is mounted in a housing frame 202 over a display 203. The lens 105 can be made of a material such as glass, sapphire, or clear plastic. The display 203 may be a Liquid Crystal Display (LCD) or an Active Matrix Organic Light Emitting Diode (AMOLED) display. A back housing part 204 connects to the housing frame 202.

An opaque mask 104 often is printed on a portion of the inside (back) surface of the lens 105. The mask is usually black and surrounds a large central area of the touch panel 102 through which the display 203 is visible. The black mask 104 may be used to hide components that are mounted under or on the back of the lens 105, e.g., touch sensor circuit interconnects.

The lens 105 has a top through-slot 106 (i.e., a slot that extends completely through the lens from front to back) and a bottom through-slot 108. The top through-slot 106 serves as part of an earpiece speaker port and the bottom through-slot 108 serves as part of a loud-speaker port. The earpiece speaker is designed for audio calls where the user holds the phone closely to an ear. The loudspeaker is designed for speakerphone calls, audiovisual playback, or audio playback where the user holds the phone away from the head. An illuminated integrated speaker port insert and rocker button 110 is partly located in the bottom through-slot 108. The button 110 extends above the lens 105 so that it can be pressed down by a user.

The smartphone 100 encloses a printed circuit board (PCB) 206 that is located between the lens 105 and the back housing part 204. A first momentary contact electric switch 208 and a second momentary contact electric switch 210 are mounted on and electrically connected to the PCB 206. A Light Emitting Diode (LED) 212 is mounted on the PCB 206 at a position centered between the two electric switches 208, 210. A speaker driver 302 for the loudspeaker is mounted in the smartphone 100. The smartphone 100 includes a pathway for acoustic energy generated by the smartphone 100 to reach the bottom through-slot 108 and the illuminated integrated speaker port insert and rocker button 110. The pathway includes a hole 304 in the printed circuit board. Acoustic energy travels around the button 110 and through passages through the button 110.

Figure 6:
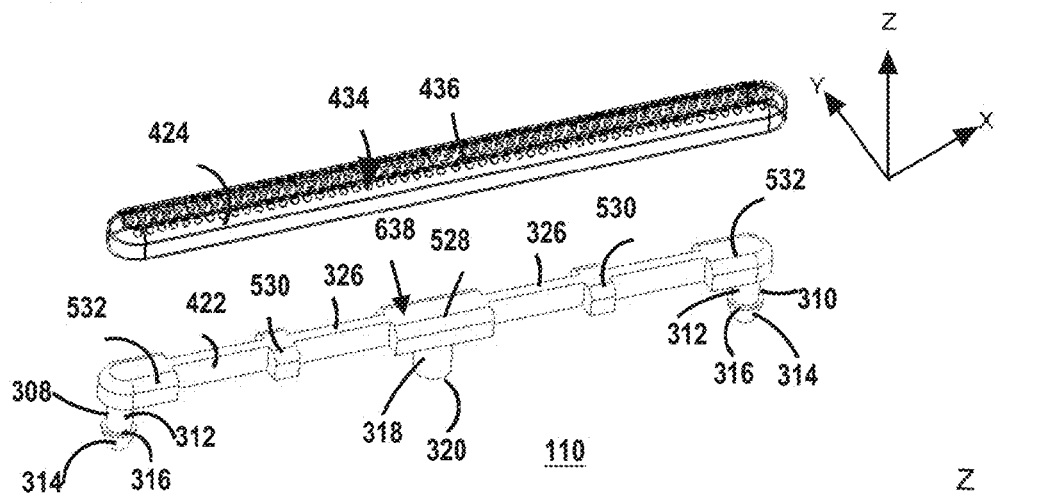
FIG. 6 is an exploded view of the illuminated integrated speaker port insert and rocker button shown in FIG. 4 and FIG. 5.

FIGS. 4-6 show three views of the illuminated integrated speaker port insert and rocker button 110. Referring to FIGS. 3-6, the button 110 includes a longitudinally extending button body 306 that extends along a longitudinal axis 402. The button 110 also has a first switch engaging portion 308 that engages with the first momentary contact electric switch 208 and a second switch engaging portion 310 that engages with the second momentary contact electric switch 210. Either switch 208, 210 may be actuating by pressing the corresponding side of the button 110. The switch engaging portions 308, 310 each include a shaft portion 312 that extends from the button body 306 and a frusto conical button retention portions 314 (also known as "dart heads") on their free (distal with respect to button body 306) ends. The dart heads 314 have large diameter ends 416 connected to the shaft portions 312. The dart heads 314 are pushed through holes 214 that are formed in the front housing part 202. The holes 214 are located above the positions of the electric switches 208, 210. The dart heads 314 catch in the holes 214 thereby retaining the button 110 in the bottom through-slot 108 of the lens 105 with the switch engaging portions 308, 310 above or resting on the switches 208, 210.

The button 110 also includes a light receiving portion 318 having a free (distal) end 320 located over the LED 212 so as to receive light therefrom. The switch engaging portions 308, 310 and the light receiving portion 318 extend perpendicularly and downward from the longitudinally extending button body 306.

The longitudinally extending button body 306 includes a molded part 422 molded out of light transmissive material over which a metal cap 424 is fitted. The molded part 422 may, for example be molded out a light transmissive organic polymer such as polycarbonate (PC) or Poly(methyl methacrylate) (PMMA) or silicone.

The molded part 422 includes a lossy light guide portion 326. The lossy light guide portion 326 takes the form of a central, longitudinally extending rectangular beam. The longitudinally extending button body 306 also include a wider central portion 528, wider medial portions 530 and wider end portions 532 that are wider than the lossy light guide portion 326, and extend the Y-axis width of the molded part 422 on either side of the lossy light guide portion 326. Some light will propagate and/or scatter into the wider portions 528, 530, 532. The light receiving portion 318 is attached to the wider central portion 528, while the switch engaging portions 308, 310 are attached to the wider end portions 532. The wider end portions 532 have 180° radiused ends in this example.

The metal cap 424 may, for example, be an electroformed part or a stamped part. The metal cap 424 has an inverted trough shape. A top surface 434 of the metal cap 424 includes an array of through holes 436 which allow acoustic energy to pass. Acoustic energy can pass by the sides of the lossy light guide 326, between the wider portions 528, 530, 532 and then reach the holes 436 in the metal cap.

Figure 12:
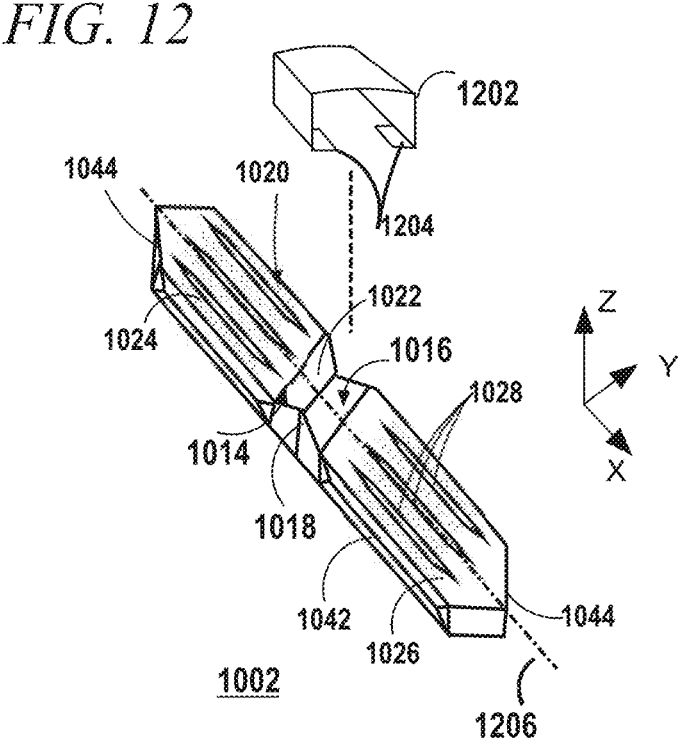
FIG. 12 is a perspective view of the illuminated integrated rocker button and speaker port insert shown in FIGS. 10-12 along with an accessory glare shield.

The molded part 422 has a top surface 638 that extends over the lossy light guide 326 and the wider portions 528, 530, 532. At least portions of the top surface can have a light scattering surface texture, such as shown in FIG. 12 and described herein below. The light scattering surface texture can be limited to locations underlying the holes 436. The light scattering surface texture makes the lossy light guide portion 326 lossy by scattering light out of the top surface 638 of the button 110, but in doing achieves the intended purpose of illuminating the button 110.

Thus the button 110 in serving the basic function of allowing the user to actuate either of the momentary contact electric switches, also provides illumination from a relatively large surface area (compared to a bare LED), and allows audio that is generated by the speaker driver 302 to exit the smartphone 100.

Figure 7:
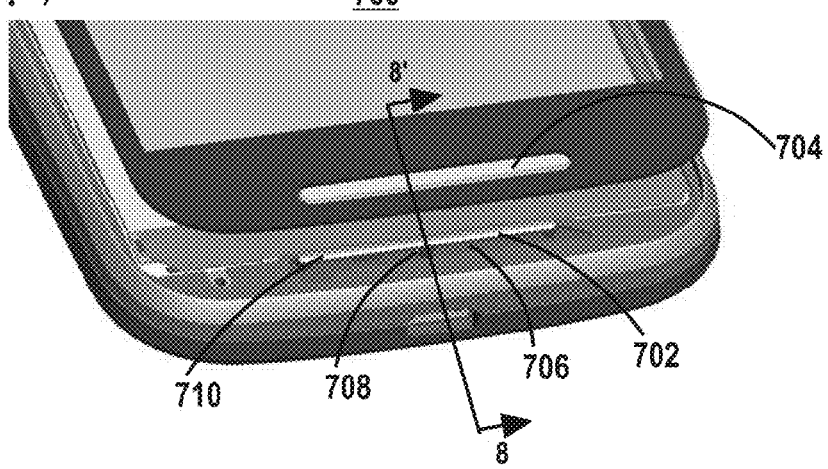
FIG. 7 is a fragmentary partially exploded view of an electronic device that includes an illuminated integrated speaker port insert and rocker button according to another embodiment.
Figure 8:
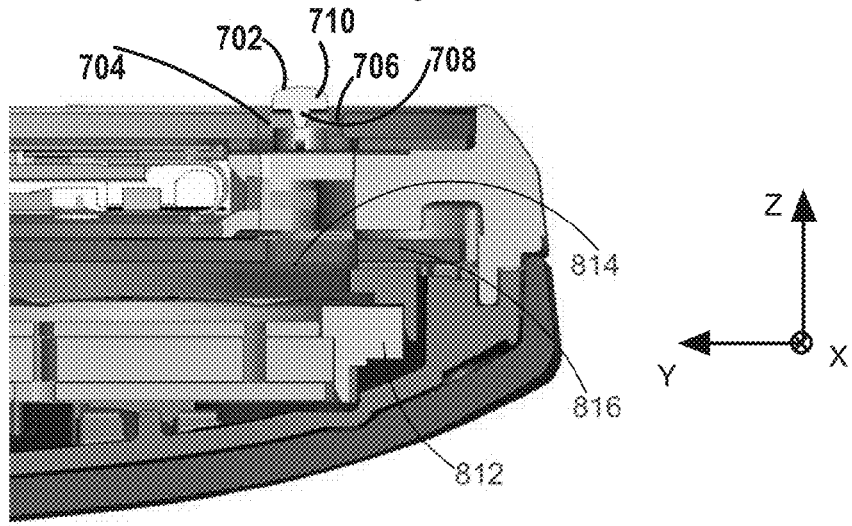
FIG. 8 is a fragmentary cross sectional view of the electronic device shown in FIG. 7.

FIG. 7 is a fragmentary partially exploded view of a smartphone 700 that includes an illuminated integrated speaker port insert and rocker button 702 according to another embodiment and FIG. 8 is a fragmentary cross sectional view of the smartphone 700 shown in FIG. 7. The cut plane corresponding to FIG. 8 is indicated in FIG. 7. This embodiment differs from that described above and shown in FIGS. 1-6 in that, although there are no holes through the button 702 itself that would allow audio energy pass, a through-slot 704 in the lens 105 in which the button 702 is located is wide enough to leave a gap 706 along the side of the button 702 for audio energy to pass. The button 702 also includes a tapered light receiving portion 708 which has free (distal) end which has a smaller diameter than a proximal end that is connected to a button body 710. The through-slot 704 serves as at least part of an audio port. The audio energy is generated by a loudspeaker driver 812 and passes through a hole 814 in a printed circuit board 816 of the smartphone 700 and then propagates through the gap 706.

FIG. 9 is a cross sectional view of a smartphone 900 according to yet another embodiment. The embodiment shown in FIG. 9 differs from those shown in FIGS. 1-7, in that an illuminated integrated speaker port insert and rocker button 902 of the smartphone includes an English letter 'V' shaped slot 904 formed in the formed in the top surface 638 of the molded part 422. The English letter 'V' shaped slot 904 is located in the top surface 434 opposite (above) the light receiving portion 318. The English letter 'V' shaped slot serves as a pair of Total Internal Reflection (TIR) mirrors that split light coming from the light receiving portion into two portions which are directed in opposite directions in the lossy light guide portion 326.

Figure 13:
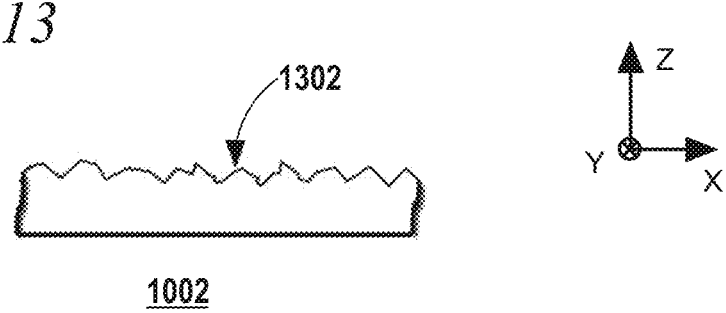
FIG. 13 is a fragmentary sectional view of the illuminated integrated rocker button and speaker port insert showing a light scattering top surface of a lossy light guide portion.

FIGS. 10-13 show an illuminated speaker port insert and integrated rocker button ("button") 1002 according to yet another embodiment. FIG. 10 is a top view of the button 1002, FIG. 11 is an elevation view of the button 1002 along with an LED 1102 used to illuminate the button 1002, FIG. 12 is a perspective view of button 1002 along with a glare shield 1202, and FIG. 13 is a fragmentary sectional view of the button 1002 showing a light scattering top surface 1302 of a lossy light guide portion.

The button 1002 includes a light receiving portion 1004 that has a bottom light receiving recess 1106 defined by a frusto conical surface 1108 topped by a hyperbolic lens surface 1010. Light from the LED 1102 that is transmitted by the frusto conical surface 1108 is incident on the inside of a parabolic collimator surface 1112 of the light receiving portion 1004. The hyperbolic lens surface 1010 which refracts light and the parabolic collimator surface 1112 which both reflects light and redirects light generally upward, with an average direction corresponding to the direction of an optical axis O.A. in the Z-axis direction and some finite spread in the direction distribution due to the finite size of the LED 1102. The hyperbolic lens surface 1010 and the parabolic collimator surface 1112 are rotational symmetric about the optical axis O.A. but alternatively could be cylindrical optic surfaces. The light that is redirected upward is incident on a left facet 1014 and a right facet 1016 which form an English letter 'V' shaped groove 1018 in an upper surface 1020 of the button 1002. The facets 1014, 1016 serve as TIR surfaces because light redirected by hyperbolic lens surface 1010 and the parabolic collimator surface 1112 and incident on the facets 1014, 1016 is incident at angles of incidence above the critical angle which is defined by:

$$\theta_c = \arcsin(1/n_b)$$

where, $n_b$ is the index of refraction of the button 1002. The button 1002 would typically have an index an index of refraction $n_b$ that is between 1.4 and 1.6 for which the corresponding critical angles $\theta_c$ are 45.6° and 38.7°.

According to certain embodiments an angle of a between the optical axis O.A. and a surface normal to the facets 1014, 1016 (see FIG. 11) is set to an angle between 53° and the critical angle for the material out of which the button is made. A few traced light rays are shown in FIG. 11.

The light receiving portion 1004 and the facets 1014, 1016 make up a central part 1022 of the button 1002. A left arm 1024 and a right arm 1026 are connected to (suitably integral with) and extend from the central part 1022 of the button 1002. The two arms 1024, 1026 are mirror images of each other, and thus the same structural description provided hereinbelow applies to both.

A set of three tapered end through-slots 1028 extend longitudinally in each arm 1024, 1026. When the button 1002 is positioned in a speaker port (for example in bottom through slot 108 of the lens 105 which as described above serves as part of a speaker port) the tapered-end through slots 1028 allow audio energy to pass through the button 1002. A proximal (with respect to the central part 1022) set of tapered ends 1030 and a distal set of tapered ends 1032 delineate, respectively, a set of proximate tapered light guide portions 1034 and a distal set of tapered light guide portions 1036. Non-tapered middle portions 1038 of the slots 1028 bound non-tapered light guide portions 1040 that are connected to the tapered light guide portions 1034, 1036. Bridge portions 1046 (only two of which are labeled to avoid crowding the drawing) crossing the tapered through slots 1028 are provided for mechanical strengthening.

Portions 1302 of the upper surface 1020 of the button 1002 that are on the light guide portions can be non-smooth and light scattering so as to effect emission of light from the button 1002. The non-smooth light scattering portions 1302 can have a random surface profile or a 1-D or 2-D periodic profile. The non-smooth light scattering portions make the light guides 1034, 1036, 1040 lossy. Injection mold finishers can appropriately roughen mold surfaces in order to produce non-smooth light scattering portions 1302 in a molded embodiment of the button 1002. The scale of the roughness can be much larger than a wavelength of light emitted by the LED 1102 or comparable to a wavelength of light emitted by the LED.

Side edges 1042 of the arms 1024, 1026 have a double bevel shape that serves as a TIR retroreflector to keep light from escaping from the edges. The double bevel shape has an English letter 'V' cross section in planes perpendicular to the longitudinal axis 1206 of the button 1002. The longitudinal axis 1206 is aligned with the X-axis shown in FIGS. 10-12. Although not necessary, it is noted that refraction of light by tapered light guide portions 1034, 1036 and scattering by non-smooth light scattering surface portions 1302 can deflect light to angles that might lead to the escape of the light from the side edges 1042 if not for the double bevel shape.

Ends 1044 of the arms 1024, 1026 also have a double bevel shape that acts as a retroreflector that reflects light that reaches the end of the arms 1024, 1026 back toward the central part 1022 of the button 1002. The outline of the double bevel shape of the ends 1044 is apparent in the FIG. 10 top view. The faces of the ends 1044 that form the double bevel can also be slightly angled as shown in FIG. 11 so as to steer the retroreflected light toward the top surface 1302 which serves as the light emission surface of the button 1002. The tilt (or draft angle) is such that intersections of the faces of the ends 1044 with planes parallel to a plane containing the optical axis O.A. of the light receiving portion 1004 and the longitudinal axis L are not vertical.

Switch engaging portions 308, 310 as described above in reference to FIGS. 2-6 extend downward from positions close to the ends 1044 of the arms 1024, 1026.

While in theory, if the facets 1014, 1016 forming the V shaped groove 1018 are angled so that light from the light receiving portion 1004 is incident upon them at an angle of incidence that is at least equal to the critical angle $\theta_c$ the light should be reflected into the arms 1024, 1026 and not transmitted through the facets 1014, 1016, in practice due, for example, to surface imperfections or bulk scattering within the material of the button 1002 some light will pass through the facets 1014, 1016. Because the LED 1102 is directly below the facets 1014, 1016 such light could appear uncomfortably bright to the user. This is addressed by providing a small glare shield 1202 which fits on the button 1002 over the facets 1014, 1016 and is retained thereon by four bendable retention tabs 1204 (two of which are visible in FIG. 12). The glare shield 1202 may for example be an electroformed part or small stamping and may for example be made of stainless steel or aluminum. Alternatively the facets 1014, 1016 could be covered with a reflective metal coating.

According to certain embodiments the bottom surface of the button 1002 excluding the bottom light receiving recess 1106 is covered with a reflective metal coating (not shown). Such a coating will reflect light scattered from the top surface 1020 notwithstanding the angle of incidence of such light being below the critical angle. Thereby such a reflective metal coating will serve redirect light that might otherwise be lost toward the top surface 1020 from which it may be emitted and provide illumination of the button 1002. Such a coating can for example be formed by vacuum metallization or an electroless plating.

Figure 14:
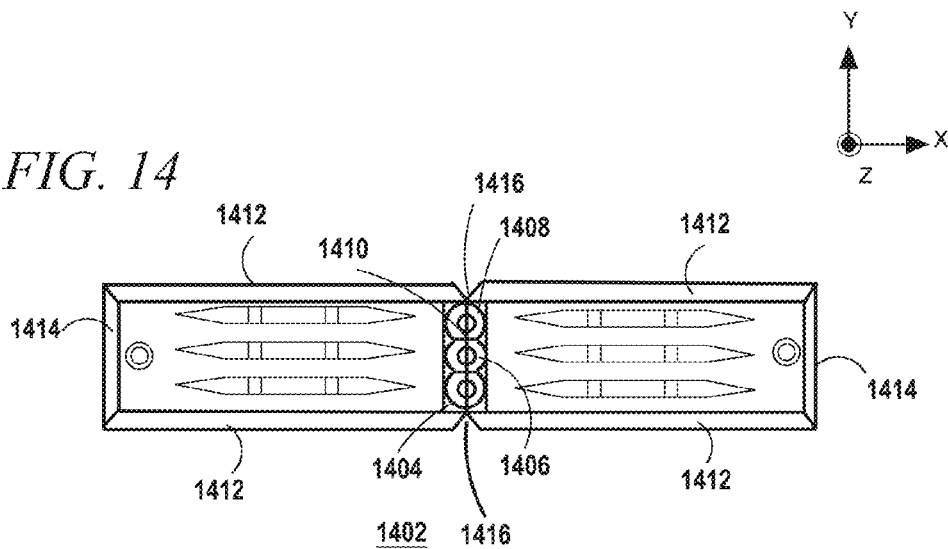
FIG. 14 is a top view of an illuminated integrated rocker button and speaker port insert with multicolor illumination.
Figure 15:
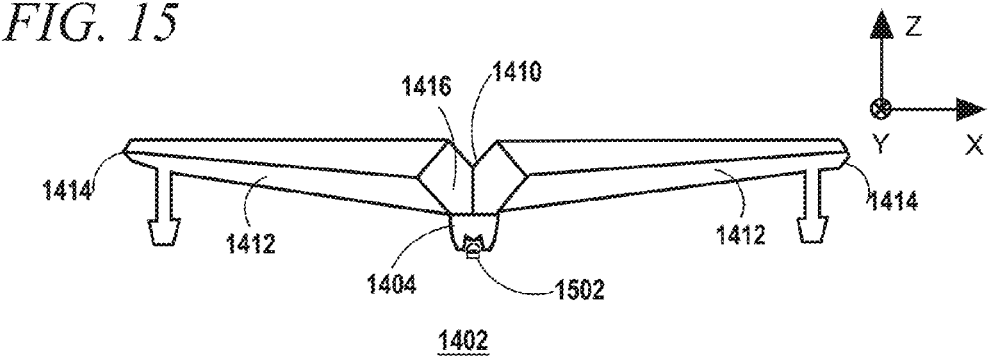
FIG. 15 is an elevation view of the illuminated integrated rocker button and speaker port insert shown in FIG. 14.

FIG. 14 is a top view of an illuminated speaker port insert and integrated rocker button "button" 1402 with multicolor illumination and FIG. 15 is an elevation view of the button 1402. The button 1402 includes three light receiving portions 1404, 1406, 1408 which are of similar design to the light receiving portion 1004 provided in the embodiment shown in FIGS. 10-13 and described above. The three light receiving portions 1404, 1406, 1408 are arranged in a row under an English letter 'V' shaped groove 1410 that is of similar design to the 'V' shaped groove 1018 described above an shown in FIGS. 10-12. The button 1402 is provided with double bevel side edges 1412 and double bevel end edges 1414. Vertical English letter 'V' shaped grooves 1416 are located on at the ends of the V shaped groove 1410.

An LED 1502 is positioned facing into each light receiving portion 1404, 1406, 1408, so that there are three LEDs. The three LEDs 1502 emit different colors, suitably red, green and blue, so that by controlling the intensity of each LED 1502 separately a gamut of colors can be produced. Only one of the LEDs 1502 is visible in FIG. 15.

An alternative multi-color embodiment may be obtained by providing the embodiment shown in FIGS. 10-13 with a three-color LED that includes three separately operable light emitting junctions formed on on top of another.

When the illuminated integrated rocker button and speaker port insert 1402 is used as an indicator light, it can present color coded indications of different events. For example one color can be used to indicate receipt of a text, another color used to indicate a missed call, yet another to indicate receipt of a voice mail and a distinct color used to indicate a social network update.

Figure 16:
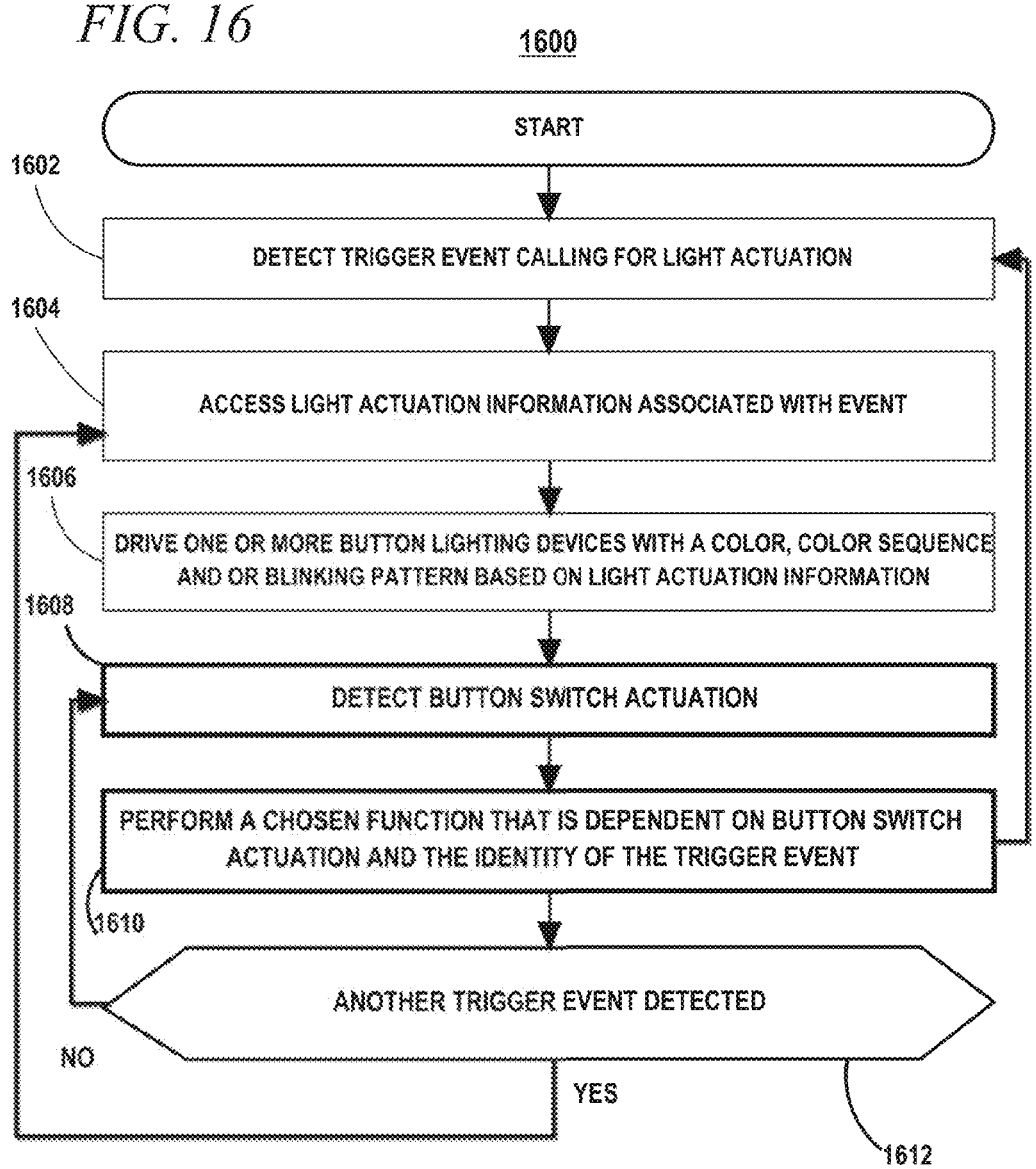
FIG. 16 is a flowchart of a method of operating an electronic device that includes button illumination according to an embodiment.

FIG. 16 is a flowchart 1600 of a method of operating an electronic device (e.g., smartphone 100) that includes button illumination according to an embodiment. In block 1602 a trigger event that calls for actuation of the illumination of the button is detected. The trigger event that is detected can for example be: an incoming telephone call, receipt of an email, receipt of a text or multimedia message, notification of a social network update, reserve battery energy dropping below a predetermined threshold, an alert from a third party app or the user starting a particular app, such as, for example a camera app.

In block 1604 light actuation information that is associated with the particular event detected in block 1602 is accessed. The information may be pre-programmed for a given event. The information may specify a color, a sequence of colors, and optionally the duration for which each color in a sequence of colors is display and optionally the duration of light-off periods between periods of illumination. The information may also specify continuous transitions between two or more colors, for example a continuous transition from red to blue in which the red intensity continuously decreases while the blue intensity is continuously increases. A user will learn to associate particular color patterns with particular events. Alternatively, a Graphical User Interface (GUI) that allows the user to customize the display of colors associated with a given event may be implemented in the electronic device. A user may configure the device to use a particular color of illumination when messages from a particular person are received. A particular color of illumination may be set when an app is started and when the app is in certain state. For example the button may be set to one color when the camera app is started and another color to indicated that automatically determined camera settings (e.g., focus, exposure) have been established.

In block 1606 one or more button lighting devices (e.g., LEDs 1502) are driven according to the light actuation information that was accessed in block 1604.

In block 1608 actuation of one of the switches 208, 210 that are actuated by the button 1402 is detected.

In block 1610 a specific action, the identity of which is dependent on the particular switch (e.g., 208 or 210) that was actuated and is dependent on the identity of the trigger event that was detected, is performed. For example, if the event that was detected was the user commencing a telephone conversation then the specific action may be raising the audio volume in the case that one switch (e.g., 210) is actuated and lowering the volume in the case that the other switch (e.g., 208) is actuated). In another case the button may be illuminated with a particular color during video playback and button actuations also used to control audio playback volume. When using the camera app, the button 1402 and two switches 208, 210 can be used to zoom in and out.

In some variations, pressing both sides of the button 1402 at the same time in order to actuate both switches 208, 210 at the same time can be used to alter the color of illumination of the button and the function of the button 1402. The color of the button will then signify its function. For example, for a media player application, the button 1402 can be toggled between controlling the volume and controlling the playback. For example, in a volume-control state, the button will be illuminated green and actuation of one switch 208 will increase the volume and actuation of the other switch 210 will decrease the volume. When the media player application is active and both switches 208, 210 are actuated simultaneously, the state may toggle between the volume-control state and a playback-control state. In a playback-control state example, the button will be illuminated blue and actuation of one switch 210 will fast-forward to the next track and actuation of the other switch 208 will rewind to the previous track. When the button 1402 is being used for a particular function (e.g., volume control or playback control), the user will press either side of the button 1402 separately in order to actuate the switches 208, 210 individually.

As another example, when a new message is received, the button 1402 can be blinked a specific number of times followed by a pause in blinking (in the off or on state) in order to signify that the specific number of unread messages have been received. The button 1402 and switches 208, 210 can be used to navigate forward and backward through a list of the received messages by pressing one or the other side of the button 1402 in order to actuate one or the other switch 208, 210.

Block 1612 is a decision block the outcome of which depends on whether a new trigger event is detected. If not then the flowchart loops back to block 1608 to detect button actuations. If on the other hand a new trigger event is detected then the flowchart loops back to block 1604 and operation proceeds as described above.

Figure 17:
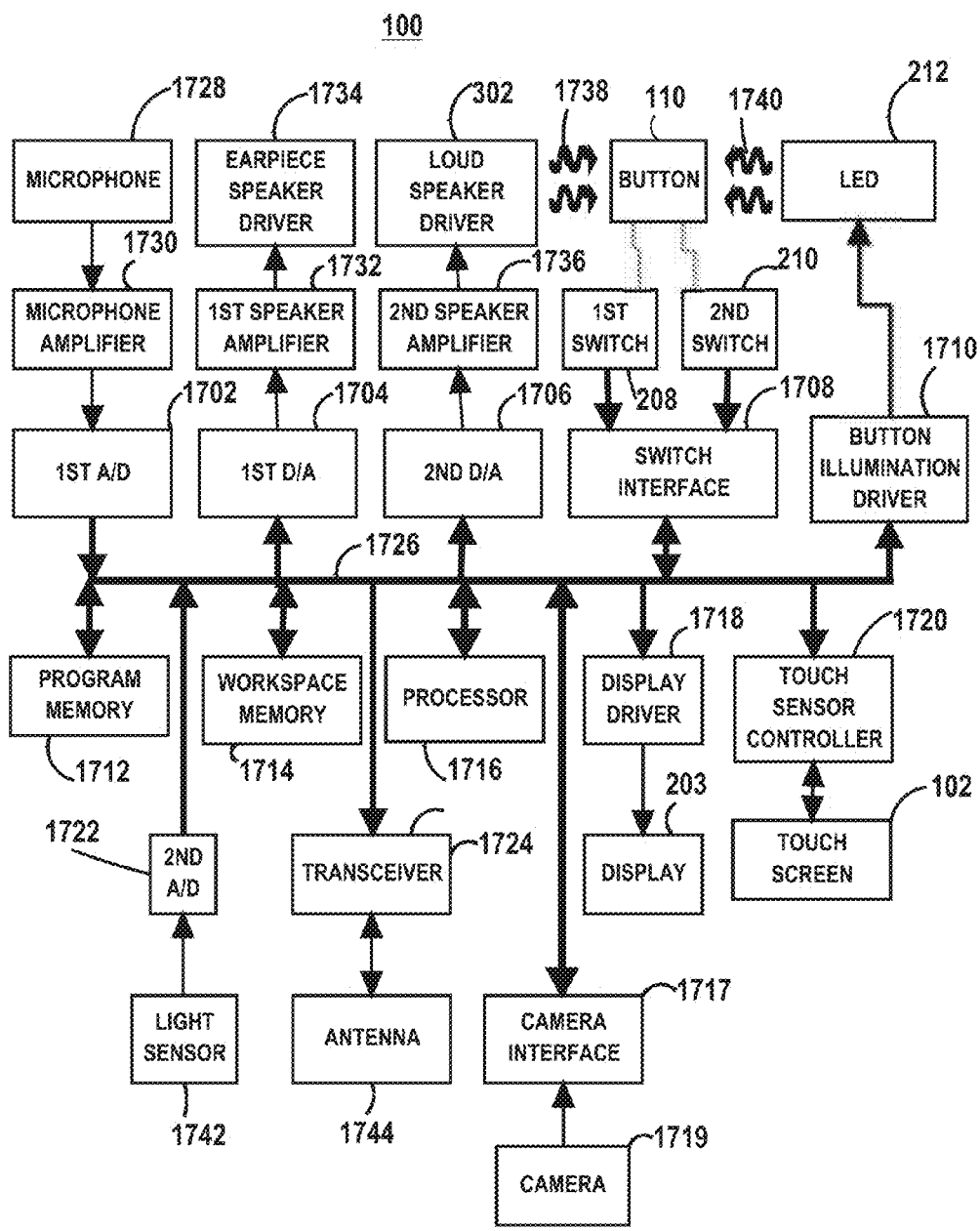
FIG. 17 is a functional block diagram of an electronic device according to an embodiment.

FIG. 17 is a functional block diagram of the smartphone 100 according to an embodiment. As shown in FIG. 17 the smartphone 100 includes a first analog-to-digital converter (ND) 1702, a first digital-to-analog converter (D/A) 1704, a second D/A 1706, a switch interface 1708, a button illumination driver 1710, a program memory 1712, a workspace memory 1714, a processor 1716, a camera interface 1717, a display driver 1718, a touch sensor controller 1720, a second ND 1722 and a transceiver 1724 all coupled together through a system bus 1726. A microphone 1728 is coupled through a microphone amplifier 1730 to the first ND 1702. The first D/A 1704 is coupled through a first speaker amplifier 1732 to an earpiece speaker driver 1734. The second D/A 1706 is coupled through a second speaker amplifier 1736 to the loudspeaker driver 302. The first momentary contact electric switch 208 and the second momentary contact switch 210 are electrically coupled to the switch interface 1708. Dashed lines represent mechanical engagement of the illuminated integrated speaker port insert and rocker button 110 with the switches 208, 210. Acoustic energy 1738 is shown coupled from the loudspeaker driver 302 to the button 110. The button illumination driver 1710 is drivingly coupled to the LED 212. Light 1740 is shown coupled from the LED 212 to the button 110. A light sensor 1742 is coupled to the second ND 1722. The brightness of the LED 212 can be adjusted based on the ambient light level as detected by a light sensor (not shown). An antenna 1744 is coupled to the transceiver 1724. The display 203 is coupled to the display driver 1718, and the touch panel 102 is coupled to the touch sensor controller 1720. A camera 1719 is coupled to the camera interface 1717.

Figure 18:
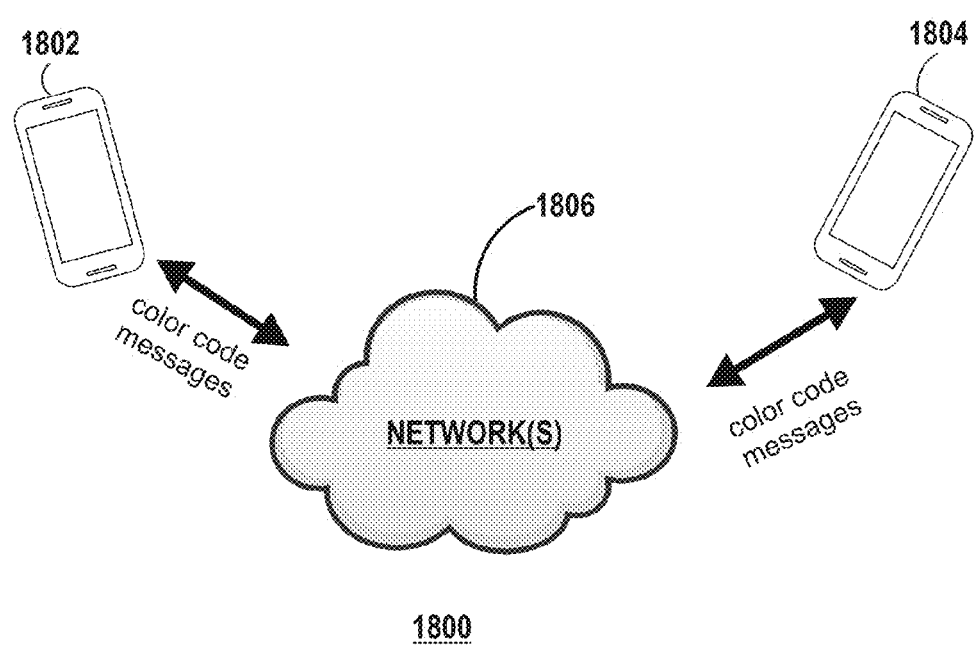
FIG. 18 is a schematic of communication system in which electronic devices according to certain embodiments are used to exchange color coded messages.
Figure 19:
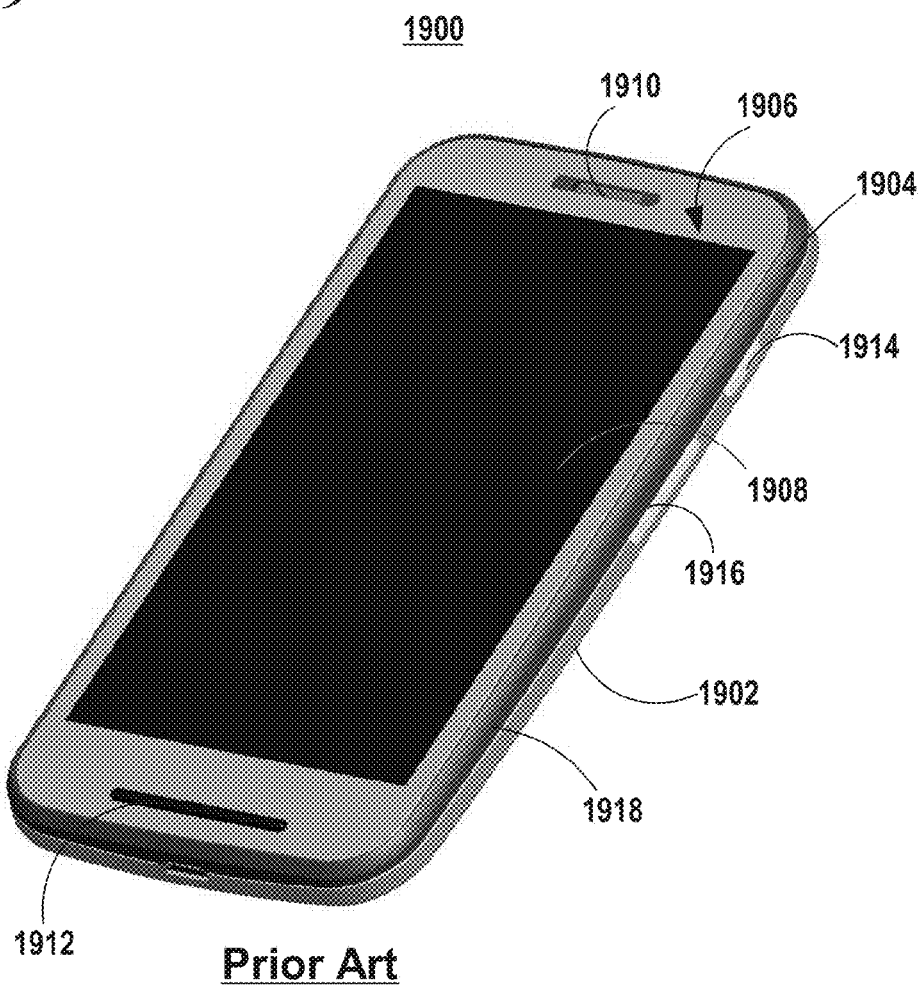
FIG. 19 is a perspective view of a prior art mobile telephone.

FIG. 18 is a schematic of communication system 1800 in which electronic devices 1802, 1804 according to certain embodiments are used to exchange color coded messages. The system includes one or more interconnected networks 1806 including, for example, cellular telephony networks, WiFi networks, and landline telephone networks. Color coding of messages may be performed automatically or under user control. At least one of the devices 1802, 1804 includes an illuminated integrated speaker port insert and button that is capable of multi-color illumination and is used to output colors that are implicitly or explicitly part of the messages exchanged through the one or more interconnected networks 1806.

While the disclosure includes a variety of smartphone embodiments alternatively the teaching disclosed herein including the illuminated integrated speaker port insert and button can be included tablet computers. As used herein the term "electronic device" includes smartphones, portable media players, remote controllers, televisions, radios, desktop computers, laptop computers, and tablet computers.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the foregoing specification, specific embodiments have been described. However, one of ordinary skill in the art appreciates that various modifications and changes can be made without departing from the scope set forth in the claims below. Accordingly, the specification and figures are to be regarded in an illustrative rather than a restrictive sense, and all such modifications are intended to be included within the scope. The benefits, advantages, solutions to problems, and any element(s) that may cause any benefit, advantage, or solution to occur or become more pronounced are not to be construed as a critical, required, or essential features or elements of any or all the claims. The scope is defined solely by the appended claims including any amendments made during the pendency of this application and all equivalents of those claims as issued.

We claim:

1. An electronic device comprising:
    a front surface of a housing;
    a speaker port formed on the front surface;
    a combination button and speaker port insert located in the speaker port and including:
        an elongated button body having a longitudinal axis,
        a light receiving portion located at a first position on the elongated button body, and
        a first switch engaging portion located at a second position on the elongated button body,
        the elongated button body including a longitudinally extending leaky light guiding portion optically coupled to the light receiving portion and;
    the electronic device further comprising a light emitting diode optically coupled to the light receiving portion; and
    a first switch located proximate the first switch engaging portion.

2. The electronic device according to claim 1 wherein the combination button and speaker port insert further comprises:
    at least one passage for sound to pass through.

3. The electronic device according to claim 2 wherein the combination button and speaker port insert further includes:
    a second switch engaging portion located at a third position on the elongated button body, wherein the first position is between the second position and the third position; and
    wherein the electronic device further comprises a second switch located proximate the second switch engaging portion.

4. The electronic device according to claim 1 wherein the light receiving portion comprises a first end located proximate the light emitting diode and a second end remote from the light emitting diode and connected to the elongated button body wherein a traverse dimension of the second end is larger than a traverse dimension of the first end.

5. The electronic device according to claim 1 wherein the first switch engaging portion further comprises a button retention portion for mechanically engaging the housing.

6. The electronic device according to claim 1 wherein the leaky light guiding portion comprises a light scattering non-smooth surface that faces out of the electronic device.

7. The electronic device according to claim 6 wherein the leaky light guiding portion has a plurality of reduced traverse dimension portions that allow sound to pass through.

8. The electronic device according to claim 1 wherein the combination button and insert for the speaker port comprises:
   a plastic part that includes the leaky light guiding portion, the light receiving portion, and the first switch engaging portion; and
   a metal cover that fits on the plastic part and which includes a plurality of holes that allow light and sound to pass through.

9. The electronic device according to claim 1 wherein the elongated button body comprises at least one surface angled so that light originating from the light emitting diode and coupled into the elongated button body through the light receiving portion impinges the at least one surface of the elongated button body at an angle of incidence above a critical angle arcsin (1/n), where n is an index of refraction of a material included in the elongated button body.

10. The electronic device according to claim 9 wherein the elongated button body comprises TIR facets slanted with respect to the longitudinal axis and located on the elongated button body opposite the light receiving portion.

11. The electronic device according to claim 1 wherein the light receiving portion has an optical axis that is perpendicular to the longitudinal axis of the elongated button body.

* * * * *